(12) United States Patent
Geislinger

(10) Patent No.: US 7,025,681 B2
(45) Date of Patent: Apr. 11, 2006

(54) DRIVE TRAIN WITH A TORSIONAL VIBRATION DAMPER AND A TORSIONALLY FLEXIBLE COUPLING

(75) Inventor: Matthias Geislinger, Salzburg (AT)

(73) Assignee: Ellergon Antriebstechnik GmbH, Hallwang (AT)

( * ) Notice: Subject to any disclaimer, the term of this patent is extended or adjusted under 35 U.S.C. 154(b) by 0 days.

(21) Appl. No.: 10/269,319

(22) Filed: Oct. 11, 2002

(65) Prior Publication Data

US 2003/0078084 A1   Apr. 24, 2003

(30) Foreign Application Priority Data

Oct. 22, 2001   (AT)   .............................. A 1675/2001

(51) Int. Cl.
*F16D 3/64* (2006.01)
(52) U.S. Cl. ................. 464/100; 464/82; 464/180; 74/574.4
(58) Field of Classification Search .......... 464/81–83, 464/85, 89, 100, 51, 180; 192/208, 55.4; 74/574, 574.4
See application file for complete search history.

(56) References Cited

U.S. PATENT DOCUMENTS

| | | | | |
|---|---|---|---|---|
| 1,922,669 A | * | 8/1933 | Elmer | 464/28 |
| 1,976,505 A | * | 10/1934 | Mallina | 369/263.1 |
| 2,053,180 A | * | 9/1936 | Carter | 464/82 |
| 2,379,175 A | * | 6/1945 | Mulheim | 464/82 |
| 2,859,637 A | * | 11/1958 | Hagenlocher | 74/574.4 |
| 4,224,807 A | * | 9/1980 | Chivari | 464/24 |
| 4,307,585 A | * | 12/1981 | Chivari | 464/82 |
| 4,337,629 A | * | 7/1982 | Walter | 464/24 |
| 6,068,555 A | * | 5/2000 | Andra et al. | 464/93 |

FOREIGN PATENT DOCUMENTS

| | | |
|---|---|---|
| AT | 405 866 | 12/1999 |
| DE | 35 20 853 | 4/1986 |
| DE | 40 12 429 | 10/1991 |

* cited by examiner

*Primary Examiner*—Kenneth Thompson
(74) *Attorney, Agent, or Firm*—Collard & Roe, P.C.

(57) ABSTRACT

A drive train with a torsional vibration damper and a torsionally flexible coupling is described, with the torsional vibration damper comprising a damping mass on the driven side which is resiliently supported with respect to a part (1) on the drive side and the torsionally flexible coupling comprising a damping mass on the drive side which is resiliently supported with respect to a part (11) on the driven side. In order to provide advantageous constructional conditions it is proposed that the torsionally flexible coupling and the torsional vibration damper are assembled into a modular unit with a common damping mass for the torsional vibration damper and the torsionally flexible coupling.

2 Claims, 2 Drawing Sheets

DRIVE TRAIN WITH A TORSIONAL VIBRATION DAMPER AND A TORSIONALLY FLEXIBLE COUPLING

FIELD OF THE INVENTION

The invention relates to a drive train with a torsional vibration damper and a torsionally flexible coupling, with the torsional vibration damper comprising damping mass on the driven side which is resiliently supported with respect to a part on the drive side and the torsionally flexible coupling comprising a damping mass on the drive side which is resiliently supported with respect to a part on the driven side.

DESCRIPTION OF THE PRIOR ART

In order to dampen torsional vibrations to a permissible amount in drive trains such as ship propulsion systems for example, torsional vibration dampers for the crank-shaft consisting of a flywheel of the drive consisting of an internal combustion engine are used on the one hand and a torsionally flexible coupling on the other hand, through which the crankshaft is connected with a gear for driving the propeller system. Both the torsional vibration damper as well as the torsionally flexible coupling comprise an outer and inner part between which leaf springs are arranged for transmitting torque. The leaf springs which are joined into packages are clamped in the zone of the outer part between intermediary pieces in a deflection-resistant way and engage in axial grooves of the inner part (AT 405 866 B). The intermediary pieces delimit chambers which are filled with a damping liquid and are connected via an annular gap leading to throttling positions between the intermediary pieces and the inner part, so that during a relative rotation between inner and outer part there is not only a pretensioning of the leaf springs, but also a displacement of the liquid between the chambers and thus an additional hydraulic relative damping due to a torque load. The difference between a torsional vibration damper and a torsionally flexible coupling must essentially be seen in the design of the torsional rigidity, the relative damping behavior and the damping mass on the driven and drive side, whereby the parameters need to be adjusted to the oscillation system as formed by the drive train. Although the use of such torsional vibration dampers and the torsionally flexible couplings can lead to an advantageous improvement in the oscillation behavior of drive systems, a comparatively high amount of constructional work is involved since generally the torsional vibration dampers need to be disposed at the one end of the crankshaft and the torsionally flexible coupling at the other end and mostly a flywheel is additionally necessary.

SUMMARY OF THE INVENTION

The invention is thus based on the object of providing a drive train with a torsional vibration damper and a torsionally flexible coupling of the kind mentioned above in such a way that not only the constructional effort can be reduced to a considerable extent, but also that the oscillation behavior of the drive train can be improved.

This object is achieved by the invention in such a way that the torsionally flexible coupling and the torsional vibration damper are assembled into a modular unit with a common damping mass for the torsional vibration damper and the torsionally flexible coupling.

As a result of the mass moment of inertia of the drive-side part of the torsional vibration damper which is small in comparison with the drive of the drive train, the drive train can be damped favorably on the drive side with respect to the torsional vibrations in cooperation with the respective moment of inertia of the damping mass on the driven side in the case of an adjusted adaptation of the torsional rigidity and the relative damping of the torsional vibration damper, so that only low alternating stresses need to be expected in the crankshaft of the internal combustion engine. Notice must be taken in this connection that the damping mass of the torsional vibration damper on the driven side which is combined with the damping mass of the torsionally flexible coupling on the drive side entails a comparatively large mass moment of inertia. As a result of this high moment of inertia of the damping mass which is common to the torsional vibration damper and the coupling, a separation which is comparable to the effect of a flywheel is achieved between the oscillation behavior of the drive train in the drive and driven zone when the torsionally flexible coupling is designed accordingly with respect to its torsional rigidity and its relative damping. This generally requires a considerably lower torsional rigidity of the torsionally flexible coupling in comparison with the torsional vibration damper. Despite the constructionally simple arrangement which allows omitting the presence of a separate flywheel for the drive motor and releases the crankshaft of the drive at one end, the entire drive train can be influenced in a far better way in comparison with known drive trains with separate devices for torsional vibration damping of the drive side and for torsionally flexible coupling of the driven side.

Although the torsional vibration damper and the torsionally flexible coupling are assembled in a different manner into a common unit, particularly simple constructional conditions are obtained when the drive-side part of the torsional vibration damper and the driven-side part of the torsionally flexible coupling comprise a common outer or inner part as a damping mass. If the drive-side part of the torsional vibration damper, the driven side of the torsionally flexible coupling and the common damping mass form three concentrically arranged parts which are mutually connected in pairs by radial leaf springs, the leaf springs can penetrate the middle part in pass-through openings between the outermost and the innermost part, which ensures a closely packed arrangement with a comparatively low outside diameter.

In order to enable a comparatively large moment of inertia for the damping mass common to both the torsional vibration damper as well as the torsionally flexible coupling at a comparatively low overall mass of the modular unit, the torsional vibration damper and the coupling are provided with a common outer part which forms the damping mass. To ensure that under such conditions it is possible to provide advantageous constructional conditions concerning the different torsional rigidity of torsional vibration damper and torsionally flexible coupling, the torsional vibration damper formed between the middle and the outermost part is connected via the middle part with the drive side of the drive train and the coupling provided between the outermost and the innermost part is connected via the innermost part with the driven side of the drive train. This measure leads to a larger radial length for the leaf springs of the torsionally flexible coupling, which benefits the lower torsional rigidity of the torsionally flexible coupling with respect to the torsional vibration damper.

BRIEF DESCRIPTION OF THE DRAWINGS

The object of the invention is shown in closer detail by way of an example, wherein.

DESCRIPTION OF THE PREFERRED EMBODIMENT

Figure 1:
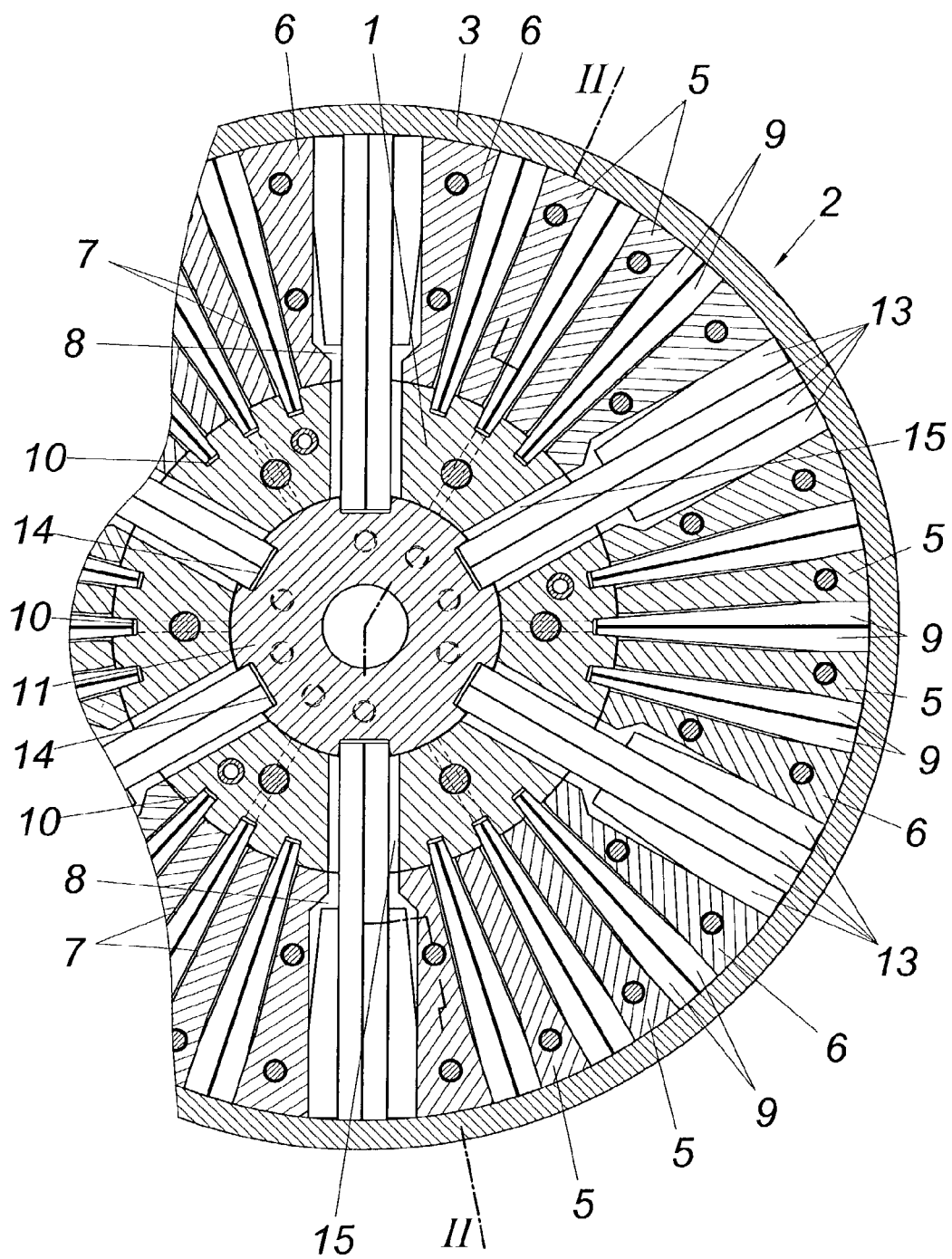
FIG. 1 shows a drive train in accordance with the invention in a simplified axially normal sectional view in the zone of a modular unit made up of a torsional vibration damper and a torsionally flexible coupling.
Figure 2:
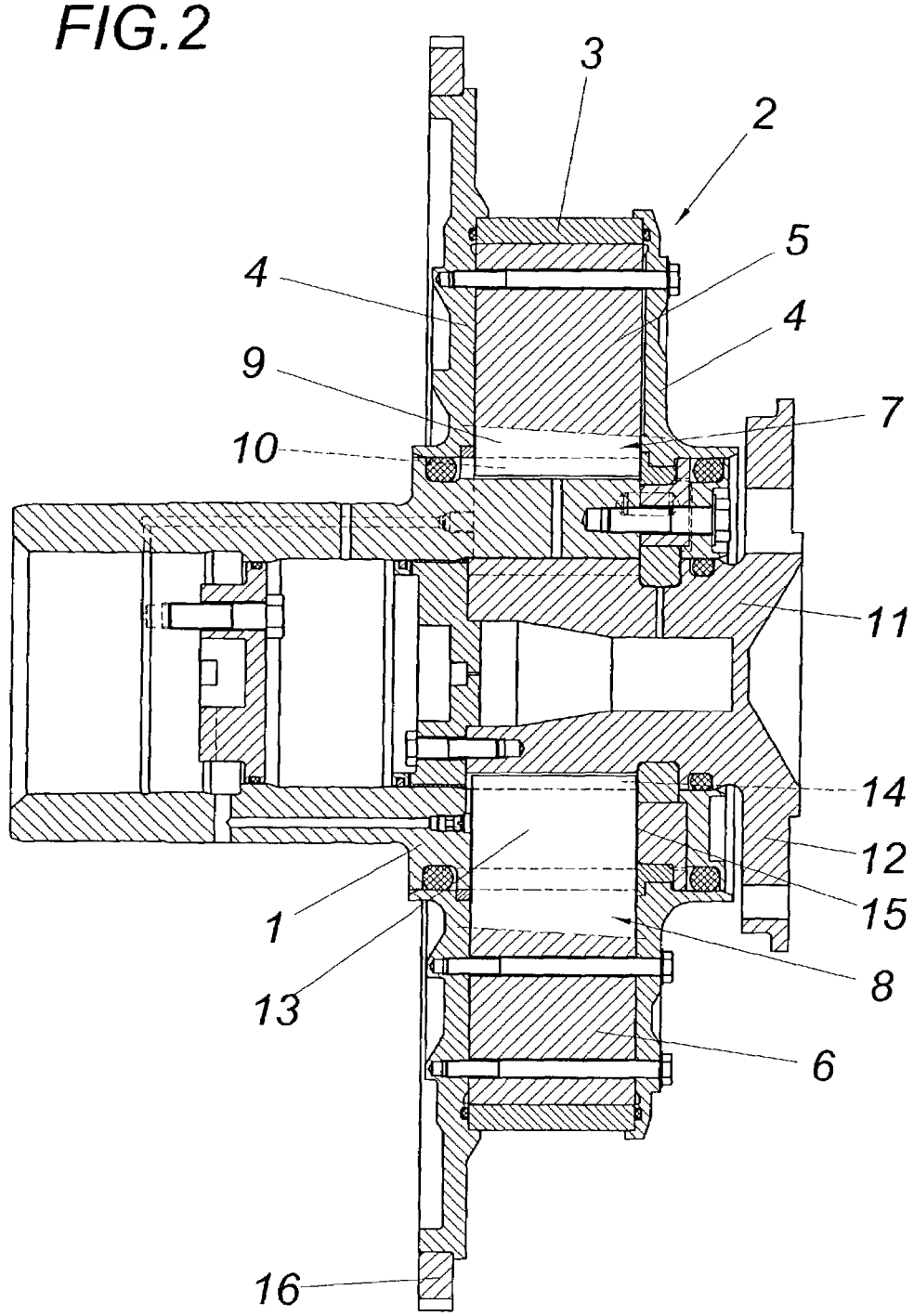
FIG. 2 shows a sectional view along the line II—II of FIG. 1 in a smaller scale.

According to the illustrated embodiment, the modular unit to be installed between a drive side and a driven side of a drive train comprises a hub which can be connected for example with a crankshaft and which forms the drive-side inner part 1 of a torsional vibration damper whose outermost part on the driven side is designated with reference numeral 2. Said outer part 2 which is rotatably held on the inner drive-side part 1 is composed of a straining ring 3 and two side plates 4 between which intermediate pieces 5 and 6 are disposed which form chambers 7 and 8 between themselves. Radial leaf springs 9 are clamped in the chambers 7 between the intermediate pieces 5 and joined into leaf spring packages, which radial leaf springs engage with their free ends in axial grooves 10, so that the outer part 2 is supported with respect to the inner part 1 by the leaf springs 9 in a torsionally flexible way. The chambers 7 are filled with a damping liquid (generally oil) which is displaced during a relative movement between the inner part 1 and the outer part 2 between the chambers 7 via the throttling gap which is produced between the supporting bodies 5 and the inner part 1. Through the dimensioning of the leaf springs 9 and the hydraulic damping arising from the displacement of the liquid between the chambers 7, the torsional vibration damper can be adjusted to the respective requirements concerning its torsional rigidity and its relative damping.

The outer part 2 acts not only as a damping mass on the driven side of a torsional vibration damper, but also cooperates with an inner driven-side part 11 for forming a torsionally flexible coupling which is connected to the driven side of the drive train by a connecting flange 12 provided on the inner part 11. Said torsionally flexible coupling is provided with leaf springs 13 for the transmission of torque between the outer part 2 and the inner part 11 which forms axial grooves 14 for receiving the free ends of the leaf springs 13. The outermost ends of the leaf springs 13 which penetrate the inner part 1 of the torsional vibration damper at least partly in the pass-through openings 15 and are joined into leaf spring packages are clamped between the intermediate pieces 6 in a deflection-resistant way, so that a torsionally flexible adjustment is enabled between the outer part 2 and the inner part 11 which is rotatably held within the hub body of the inner part 1. In order to increase the damping, the chambers 8, which arise between the intermediate pieces 6 and continue into the pass-through openings 15, are filled with a damping liquid and are in flow connection via throttling gaps between the inner part 11 and the hub body of the inner part 1. The torsional rigidity and the relative damping of the torsionally flexible coupling arising between the outer part 2 and the inner part 11 can therefore be constructionally predetermined independent of the torsional vibration damper between the inner part 1 and the outer part 2.

Since the outer part 2, as a damping mass, belongs both to the oscillation damper on the input side as well as the torsionally flexible coupling on the output side, it comes with a comparatively high mass moment of inertia which is increased by a gear rim 16 on the one side plate 4 of the outer part 2. Said gear rim 16 is driven by a starter for the drive when the drive motor is started. As a result of the comparatively high mass moment of inertia of the outer part 2 in comparison with the driven-side inner part 11 of the torsionally flexible coupling, the driven side of the drive train can be substantially isolated from the drive side from an oscillation viewpoint through a respective adjustment of the torsional rigidity and the relative damping of said coupling. Moreover, the outer part 2 can be used advantageously as a damping mass for damping the torsional vibrations of the drive-side drive train, so that the torsional vibration behavior of the entire drive train can be improved and the constructional efforts can be reduced substantially through the arrangement in accordance with the invention of three concentric parts 1, 2 and 11 between which a torsional vibration damper is formed on the one hand and a torsionally flexible coupling on the other hand.

The invention claimed is:

1. A drive train comprising a torsional vibration damper and a torsionally flexible coupling assembled into a modular unit with a common damping mass for the torsional vibration damper and for the torsionally flexible coupling, the modular unit being arranged between a drive side and a driven side, the drive side and the driven side being axially spaced from each other and being coupled to each other by the modular unit, the common damping mass being comprised of a damping mass of the torsional vibration damper on the driven side which is resiliently connected to a spring means to a part on the drive side, a damping mass of the torsionally flexible coupling on the drive side which is resiliently connected by another, separate spring means to a part on the driven side, and a part common to the torsional vibration damper and the torsionally flexible coupling, the latter part holding the damping mass of the torsional vibration damper and the torsionally flexible coupling, the common damping mass, the part on the drive side and the part on the driven side forming concentrically arranged innermost, middle and outermost parts connected in pairs by radial leaf springs constituting said spring means, the leaf springs passing through openings in the middle part between the innermost and outermost parts.

2. The drive train of claim 1, wherein the common damping mass is connected by the middle part with the drive side of the drive train, and the torsionally flexible coupling arranged between the innermost and outermost parts connects the innermost part with the driven side of the drive train.

\* \* \* \* \*